United States Patent Office 3,258,388
Patented June 28, 1966

3,258,388
ADHESIVE COMPOSITION FOR BONDING
RUBBER TO METAL
Elmer W. Coleman, Jr., Wilmington, Del., and Donald
M. Alstadt, Erie, Pa., assignors to Lord Corporation,
a corporation of Pennsylvania
No Drawing. Application Nov. 20, 1959, Ser. No.
854,231, which is a continuation of application Ser. No.
504,714, Apr. 29, 1955. Divided and this application
Aug. 31, 1962, Ser. No. 220,889
15 Claims. (Cl. 161—218)

The present invention relates to a novel adhesive composition especially suitable for bonding rubber to metal. This application is a division of application Serial No. 854,231 filed November 20, 1959, now abandoned, which application is a continuation of application Serial No. 504,714 filed April 29, 1955, now abandoned.

There has been a wide variety of materials suggested for use in bonding rubber to metal. Adhesives for this purpose have generally comprised a combination of a material which bonds readily to rubber with a material which bonds to metal upon heating of the assembly under pressure. Single materials which bond to rubber well as to metal have also been disclosed.

While in some of the prior art instances the adhesion provided between the rubber and the metal is high, the general order of adhesion provided is moderate to poor. Moreover, the resistance to heat, solvents and moisture of the bonds provided by the prior adhesives is not as great as is normally desired in commercial applications. Another limitation with the use of these adhesive compositions is that the vulcanizing conditions under which bonding is effected must be very carefully controlled.

It is the principal object of the present invention to provide a novel adhesive composition for bonding rubber to metal.

Another object is to provide an adhesive for bonding rubber to metal by which the bond produced between the rubber and metal possesses improved resistance to heat, solvents and moisture.

A further object of the invention is to provide an adhesive for bonding rubber to metal which bonding may be effected under a wide variety of vulcanizing conditions.

Other objects will become apparent from a consideration of the following specifications and claims.

The method of the present invention comprises, in the bonding of rubber to metal involving interposing between the rubber body and metal body an intermediate phase adherable to metal and rubber and heating the composite structure under pressure, the improvement which comprises interposing between said metal body and said rubber body an intermediate phase comprising a material adherable to metal and a poly-C-nitroso aromatic compound.

It has been found that the use of a poly-C-nitroso compound, such as a di-C-nitroso, aromatic compound in conjunction with a rubber-to-metal adhesive results in an improved bond over what is obtained when the poly-C-nitroso aromatic compound is not included. This is true generally of any known type of rubber-to-metal adhesive. The improvement is so marked, in fact, that the adhesive material with which the poly-C-nitroso aromatic compound is employed need not possess any normal bonding affinity for rubber. In this case, the poly-C-nitroso aromatic compound provides the bonding between the rubber body and the intermediate bonding phase. The reason why the poly-C-nitroso aromatic compound results in such improved bonding between the rubber body and the intermediate adhesive layer is not fully understood. It is believed, however, that, during curing of the assembly under heat and pressure, the poly-C-nitroso aromatic compound reacts with olefin chain structure with which it comes in contact, that is, the rubber body itself or a "tie coat" of olefinic material on and merged with the rubber body. Since the remainder of the poly-C-nitroso aromatic molecule is bound in the intermediate bonding phase, a chemical linkage between this phase and the rubber body is obtained. This theory is strengthened by the fact that if only a metal adherent which possesses no significant rubber adhesion properties is employed in conjunction with the poly-C-nitroso compound, the rubber body can nevertheless be bonded securely to the metal body.

All that is necessary, therefore, in accordance with the broader aspects of the invention is that, in addition to the poly-C-nitroso compound, a material possessing metal adherent properties be present. In such a case the intermediate bonding phase will comprise the metal adherent and the poly-C-nitroso compound, the metal adherent being at least in contact with the surface of the metal body and the poly-C-nitroso compound being at least in contact with the rubber body. According to the practice of the invention disclosed and claimed in our copending application Serial No. 220,890, filed August 31, 1962, a vulcanizable olefin discussed more in detail hereinafter will also be employed, since the inclusion of the poly-C-nitroso aromatic compound in such system provides or imparts thereto particularly marked adhesion between the rubber and the metal.

Referring specifically to the poly-C-nitroso aromatic compound, it may be any aromatic hydrocarbon, such as the benzenes, naphthalenes, anthracenes, biphenyls and the like, containing at least two nitroso groups (—NO) attached directly to non-adjacent ring carbon atoms. The presently preferred poly-C-nitroso are the di-C-nitroso compounds, especially the dinitroso benzenes and naphthalenes, such as the meta or paradinitrosobenzenes and the meta- or paradinitrosonaphthalenes and the invention will be described more in detail hereinafter in terms of the di-C-nitroso compounds although it will be understood that corresponding aromatic compounds containing three or more nitroso groups may be employed. The nuclear hydrogens of the aromatic nucleus may be replaced by alkyl, alkoxyl, cycloalkyl, aryl, arylalkyl, arylamine, aryl nitroso amine, halogen, and the like, groups. The presence of such substituents on the aromatic nucleus has little effect on the utility of the di-C-nitroso compounds in the present invention and, as far as is presently known, there is no limitation as to the character of the substituents, and they may be organic or inorganic in nature. Hence, where reference is made herein to poly-C-nitroso or di-C-nitroso "aromatic compound," "benzenes," or "naphthalenes" it will be understood to include such substituted derivatives as well as the unsubstituted dinitroso compounds, unless otherwise specified. Hydroxy substituted di-C-nitroso aromatic compounds are stated in the literature to rearrange with the nitroso group to form the oxime, and, hence, are not considered dinitroso aromatic compounds as herein defined. Ortho di-C-nitroso compounds also do not exist as such and, hence, are not included herein.

The preferred poly-C-nitroso aromatic compounds, as stated, are the meta- or paradinitrosobenzenes and naphthalenes. In this connection, the compounds falling within the following generic formula have been found to be particularly advantageous:

where A is phenyl or naphthyl, where R is an alkyl, cycloalkyl, aralkyl, aryl, aryl amine or alkoxy group containing from 1 to 20 carbon atoms or halogen and where $n$ is 0 to 3. Of the substituted derivatives the alkyl substituted derivatives are preferred. Examples of such substituted aromatic di-C-nitroso compounds are:

p-Nitrosobenzene
m-Dinitrosobenzene
2,5-dinitrosoparacymene
2-methyl-1,4-dinitrosobenzene
2-methyl-5-chloro-1,4-dinitrosobenzene
1,4-dinitrosonaphthalene
2-fluoro-1,4-dinitrosobenzene
2-methoxy-1,3-dinitrosobenzene
5-chloro-1,3-dinitrosobenzene
2-benzyl-1,4-dinitrosobenzene
2-cyclohexyl-1,4-dinitrosobenzene Referring specifically to the metal adherent, it may be selected from a wide variety of organic materials, that is compounds and polymers, and mixtures thereof which possess adhesive properties toward metal characteristic of adhesives commonly employed in adhesive-bonded, structural, load-carrying fabrications of metal members with themselves and other structural elements. Such materials possess, in the bonded assembly, a high order of bond strength, usually at least about 20 pounds per lineal inch under stripping test, and a high order of cohesiveness. The cohesive and adhesive properties of such materials in the bonded assembly must be at least substantially equal to the cohesive strength of the rubber which is bonded to the metal, and such cohesive and adhesive properties are developed under conditions commonly employed to vulcanize the rubber body stock. Organic compounds and polymeric materials that adhere to metal surfaces in the above-discussed manner are well known and include: (a) thermosetting condensation polymers, such as thermosetting phenol-aldehyde resins, thermosetting epoxy resins, thermosetting polyester resins, thermosetting triazine resins, and the like; (b) polymers and copolymers of polar ethylenically unsaturated materials, such as polyvinyl butyral; polyvinyl formal; polyvinyl acetate; chlorinated polyvinylchloride; copolymers of vinyl acetate and vinyl chloride; chlorinated copolymers of vinyl acetate and vinyl chloride, polymers of acrylic acid; copolymers of acrylic acid and conjugated dienes, such as butadiene-1,3,2-chlorobutadiene-1,2,2,3-dichlorobutadiene - 1,3, and after halogenated products thereof; polymers of methacrylic acid; copolymers of methacrylic acid and conjugated dienes; copolymers of vinyl pyridine and conjugated dienes, and polyvalent acid reaction products thereof, and the like; (c) halogenated rubber, such as chlorinated natural rubber and chlorinated synthetic rubber; for example, chlorinated polychloroprene, chlorinated polybutadiene; chlorinated copolymers of butadiene and styrene; mixtures of chlorinated rubber with hydrohalogenated rubber or hypohalogenated rubber, and the like; (d) polyisocyanates, such as P,P' diisocyanato diphenyl methane, hexamethylene diisocyanate, P,P',P'' triisocyanato triphenyl methane, 3,3'-dimethyl-4,4'-biphenylene dissocyanate, 3,3'-dimethoxy-4,4' - biphenylene diisocyanate, phosgenated aniline-aldehyde resins, such as those disclosed in patent 2,683,730, and the like.

The rubber which may be bonded to metal in accordance with the present invention may be selected from any of the natural rubbers and olefinic synthetic rubbers including polychloroprene, polybutadiene, neoprene, Buna-S, Buna-N, butyl rubber, grominated butyl rubber, and the like. The metals to which the rubber may be bonded may also be selected from any of the common structural metals such as iron, steel (including stainless steel), lead, aluminum, copper, brass, bronze, Monel metal, nickel, zinc, and the like.

In carrying out the method of the present invention, an intermediate phase comprising the di-C-nitroso compound and the metal adherent is interposed between the surface of the rubber body and the surface of the metal body which it is desired to bond together. In the intermediate phase the di-C-nitroso aromatic compound will at least be available at the interface between the rubber body and the intermediate phase, and the metal adherent will at least be available at the interface between the metal body and the intermediate phase. Such an intermediate phase is ordinarily provided by the application of a mixture comprising the di-C-nitroso aromatic compound and the metal adherent. The intermediate phase may also be provided, however, by applying the components separately. In connection with this latter embodiment, any one of several procedures may be followed, including applying the di-C-nitroso aromatic compound to the rubber surface and the metal adherent to the metal surface; applying the metal adherent to the metal surface after which the di-C-nitroso aromatic compound is applied thereover, or the di-C-nitroso aromatic compound may be applied to the rubber surface following which the metal adherent may be applied thereover. Various combinations of these means may be employed, such as the application of a mixture high in di-C-nitroso aromatic compound and low in metal adherent, to the rubber body and the application of a mixture of di-C-nitroso aromatic compound and metal adherent high in metal adherent thereover or to the metal body. The exact procedure followed is not critical, the important factor being the interposition between the rubber and the metal to be bonded of an intermediate phase comprising the di-C-nitroso aromatic compound and a metal adherent, the di-C-nitroso aromatic compound being at least available to the rubber for adhesion to the rubber and the metal adherent being at least available to the metal for adhesion to the metal.

As stated in accordance with the invention disclosed and claimed in our copending application, Serial No. 220,890, filed August 31, 1962, there is also employed a readily vulcanizable olefin such as the polybromobutadienes, the polychlorobutadienes, and partially afterhalogenated products thereof, partially afterhalogenated copolymers of isobutylene and butadiene, particularly those partially afterbrominated copolymers disclosed in U.S. Patent 2,631,984, the polycyanobutadienes, the polynitrobutadienes, polycyclopentadiene, tetrachlorocyclopentadiene, partially hydrohalogenated rubbers, partially hypohalogenated rubbers, and the like. Such olefins are readily vulcanizable, that is to say, they are more vulcanizable than polybutadiene. Preferably, the olefin employed is at least as vulcanizable as poly 2-chlorobutadiene-1,3. Particularly advantageous olefins in this regard are polychloroprene (poly 2-chlorobutadiene-1,3), poly 2,3-dichlorobutadiene1,3 and after-brominated poly 2,3-dichlorobutadiene-1,3, such as those containing a bromine content of between about 7.5 and about 42 mol percent, preferably between about 15 and about 36 mol percent.

When a vulcanizable olefin is employed as part of the intermediate bonding phase it may be applied in admixture with the di-C-nitroso aromatic compound, only, or in admixture with the di-C-nitroso aromatic compound and metal adherent. Since the vulcanizable olefin, when used in the intermediate bonding phase, is primarily for the purpose of fostering adhesion with the rubber it will at least be available at the interface between the rubber body and the intermediate bonding phase. When the three main components are applied in admixture to the rubber or metal surface, the olefin and, of course, the di-C-nitroso aromatic compound, will be available to the rubber surface, and the rubber adherent will be available to the metal. A mixture of only the olefin and di-C-nitroso aromatic compound may also be applied to the rubber surface or to a previously applied film containing the metal adherent on the metal surface.

As is well known in the art, it is often desirable to provide a "tie coat" or layer between the adhesive bonding phase and the actual rubber body. Such a tie coat may be employed in accordance with the present invention. The tie coat normally comprises a rubber, either a natural or synthetic rubber or rubber-like material, or a vulcanizable olefin of the type discussed above, and may be applied either to the rubber surface or over the adhesive layer, such as in the form of a solution or as a preformed sheet. Such tie coats are selected on the basis of the rubber body and adhere well thereto. The enhanced adhesion to the rubber body afforded through the use of the di-C-nitroso aromatic compound in accordance with the present invention is applicable here in fostering adhesion between the bonding phase and the tie coat. In view of this and since the tie coat is merged with the rubber body it is considered herein as part of the rubber body. Thus, where reference is made to rubber body or surface of the rubber body, it will be understood to refer equally to the rubber body proper when no tie coat is employed and to the merged rubbed body tie coat when a tie coat is employed.

Reference has been made hereinabove to the application of the various components of the adhesive bonding phase to one or the other or both of the surfaces to be joined. The particular mode of application is not critical insofar as the broader aspects of the invention are concerned, and one or more of the components may be applied in solid, finely divided form, or in liquid form, most advantageously the latter. When applied in liquid form, one or more of the components, which is a liquid, may serve as the vehicle, or a solvent for one or more of the components may be employed. The application of the various components in the form of a solution of at least one of them is preferred. In this connection it is generally preferred that the metal adherent, and vulcanizable olefin when employed, be in solution whereas the di-C-nitroso aromatic compound may merely be suspended in such solution. Such solution is included herein and in the claims where reference is made to the application of the composition in the form of a solution. As solvent there may be employed any organic liquid or mixtures thereof in which one or more of the ingredients to be applied is soluble to the extent dictated by the viscosity of the solution and the exact means of application to be employed. Generally, the solids content of such a solution may range from as low as about 5% to as high as about 30%, although in most cases, where the composition will be applied in brushing, the solids content will range between about 10% and about 25%. Any solvent employed should also be readily volatile so that lengthy drying periods are not encountered. The preferred solvents, especially for the preferred compositions discussed hereinafter, are aromatic hydrocarbons, such as benzene, toluene, xylene, and the like, and the chlorinated aromatic hydrocarbons such as monochlorobenzene, dichlorobenzene, and the like. Small amounts of aliphatic hydrocarbons, chloroaliphatic hydrocarbons, ketones, ethers and/or alcohols may be included if desired.

After the adhesive component or components have been applied as described above and any solvent evaporated, the rubber surface and the metal surface which are to be bonded are brought together and the assembly heated under pressure to cause vulcanization of the rubber stock and bonding. As is well known in the art, the exact time and temperature of curing will vary depending upon the nature of the body employed as well as on the nature of the ingredients in the adhesive phase. In general, however, the temperature during curing will be between about 270° F. and about 350° F. and the curing time will range from about 20 to about 60 minutes.

As a general purpose adhesive requiring but a single application of materials, it is generally preferred to employ a mixture of all the materials to be present in the intermediate bonding phase, namely, a mixture of the di-C-nitroso aromatic compound and the metal adherent, and also the vulcanizable olefin, when employed. In any mixture of the di-C-nitroso aromatic compound will be effective in amounts as low as about 1%, by weight, based on the weight of the solids. Amounts of di-C-nitroso aromatic compound greatly in excess of that amount—even as high as 90–95% may be employed. The metal adherent is also effective in relatively low levels such as about 5% and it may be present in amounts as high as about 94%, by weight, based on the weight of the solids in the mixture. When the olefin is employed, the amount thereof may vary widely from as low as about 5% to as high as about 94%, on the same basis.

Referring specifically to the di-C-nitroso aromatic compound, the functional portion of this material is the nitroso groups themselves. Hence, in any intermediate bonding phase of the present invention the amount of nitroso groups at least available to the rubber surface is important. In general, sufficient of the di-C-nitroso compound will be employed so that nitroso groups make up at least about .4% of the solids in the intermediate bonding phase at least adjacent the rubber surface. The amount of di-C-nitroso aromatic compound employed may be well above this figure, and may go as high as that providing about 42%, by weight, of nitroso groups in the solids of the intermediate bonding phase at least adjacent the rubber surface.

Particularly advantageous metal adherents for use in admixture with the di-C-nitroso aromatic compound (and also with an olefin if employed) are the chlorinated rubbers. Especially advantageous olefins for use in such a mixture are polymers of chlorine-substituted butadiene such as polychloroprene, 2,3-dichlorobutadiene-1,3 and the after-brominated polymers of 2,3-dichlorobutadiene-1,3 of the type mentioned above.

The following examples are given to illustrate the invention and are not intended to limit the scope of the invention in any way inasmuch as the relative proportions may vary and the ingredients may be substituted by others which perform the equivalent function to those given.

*Example I*

An adhesive consisting of 50 parts 2,3-dinitrosoparacymene, 50 parts soluble, fusible, acid-catalyzed phenol-formaldehyde resin, 4 parts hexamethylenetetramine, and 125 parts of a mixture of equal parts methanol and methyl ethyl ketone is brushed on a strip of degreased, grit-blasted, cold-rolled steel, 2⅜" x 1", and allowed to dry for about 30 minutes. A ¼" slab of unvulcanized natural rubber compound consisting of 100 parts smoked sheet, 40 parts channel black, 10 parts zinc oxide, 2.5 parts sulfur, 0.5 part 2-mercaptobenzothiazole, 0.5 part benzothiazyl disulfide, 0.2 part zinc diethyl dithiocarbamate, 2 parts pine tar and 1.5 parts phenyl-beta-naphthylamine, is applied to the adhesive-coated surface. The rubber-adhesive coated metal assembly is vulcanized 30 minutes at 312° F. The bond which results is such that the rubber cannot be stripped from the metal without tearing into the body of elastomer.

*Example II*

An adhesive consisting of 50 parts paradinitrosobenzene, 50 parts polyvinyl butyral (XYHL grade) and 333 parts methanol is employed in the manner described in the foregoing example. The natural rubber compound used in Example I is employed and the assembly is vulcanized under pressure for 20 minutes at 320° F. The bond which results in such that the rubber cannot be stripped from the metal without tearing into the body of elastomer.

*Example III*

An adhesive consisting of 10 parts 2,5-paradinitrosocymene, 30 parts poly 2,3-dichlorobutadiene-1,3 (40° C. emulsion polymer, conversion approximately 90%), 70 parts chlorinated natural rubber (125 CPS grade) and 300 parts toluene is applied to the steel surface and processed in the manner of the foregoing examples. The natural rubber compound used in Example I is employed and the assembly is vulcanized under pressure for 30 minutes at 312° F.

An adhesive similar to the above except that it contains no nitroso compound is processed along with the nitroso-containing cement.

Adhesion is measured in both cases by a method similar to that described in ASTM testing specification D429-47T, Method B. In this test, the rubber is peeled or stripped from the metal at an angle of 90° and the adhesion recorded in pounds per inch. The assembly produced with the mixture of chlorinated rubber and poly chlorobutadiene pulls 22 pounds per inch. The nitroso-containing adhesive assembly pulls 52 pounds per inch and tears substantially into the body of the elastomer indicating a bond strength of more than twice that of the control adhesive.

*Example IV*

An adhesive consisting of 15 parts paradinitrosobenzene, 30 parts after-brominated poly 2,3-dichlorobutadiene-1,3 (approximately 27 mol percent Br), 70 parts chlorinated natural rubber (125 CPS grade) and 300 parts toluene is applied to the steel surface and processed in the above-described manner. The elastomer employed is a butyl rubber (GR–I) compound consisting of 100 parts base polymer, 54 parts SRF black, 5 parts zinc oxide, 2 parts sulfur, 1 part tetraethylthiuramidisulfide and 0.5 part 2-mercaptobenzothiazole. The elastomer-adhesive coated metal assembly is vulcanized under pressure for 25 minutes at 307° F.

A binary mixture of the chlorinated rubber and brominated polychlorobutadiene is processed along with the nitroso-containing adhesive.

Adhesion is measured as in Example III. The "binary" mixture of chlorinated rubber and brominated polychlorobutadiene pulls 12 pounds per inch. The nitroso-containing adhesive pulls 95 pounds per inch, almost an eight-fold improvement over the control adhesive.

*Example V*

An adhesive consisting of 10 parts paradinitrosobenzene, 30 parts after-brominated poly 2,3-dichlorobutadiene-1,3 (approx. 27 mol percent Br), 70 parts chlorinated natural rubber (125 CPS grade), and 300 parts toluene is applied to the steel surface and processed in the above-described manner. The elastomer employed is a standard GR–S compound consisting of 100 parts base polymer, 50 parts HAF black, 3 parts zinc oxide, 2 parts stearic acid, 1.8 parts sulfur, 1 part N-cyclohexyl-2-benzothiazole sulfenamide, 1.25 parts phenyl-beta-naphthylamine and 10 parts rosin. The elastomer-adhesive coated metal assembly is vulcanized under pressure for 30 minutes at 288° F.

A binary mixture of the chlorinated rubber and brominated polychlorobutadiene is processed along with the nitroso-containing adhesive.

Adhesion is measured as in Example III. The binary mixture of chlorinated rubber and brominated polychlorobutadiene produces adhesion of 38 pounds per inch, separating between the adhesive and the elastomer. The nitroso-containing adhesive assembly pulls 73.5 pounds per inch, tearing into the body of elastomer.

*Example VI*

An adhesive consisting of 20 parts 2,5-dinitrosoparacymene, 30 parts after-brominated poly 2,3-dichlorobutadiene-1,3 (approx. 27 mol percent Br), 70 parts chlorinated natural rubber (125 CPS grade) and 300 parts toluene is applied to the steel surface and processed in the above-described manner. A "binary" mixture of the chlorinated rubber and chlorobutadiene is processed along with the nitroso-containing adhesive. The elastomer employed is a natural rubber compound consisting of 100 parts smoked sheet, 5 parts channel black, 15 parts lead oxide, 10 parts zinc oxide, 2.5 parts 2-mercaptobenzothiazole, 1.5 parts sulfur, 2 parts phenyl-beta-naphthylamine, 2 parts pine tar and 2 parts wax. The elastomer-adhesive coated assembly is vulcanized under pressure for 30 minutes at 288° F. The laminate produced with the binary mixture can be separated, the failure occurring between the cement and the rubber. The adhesion produced with the nitroso-containing adhesive is such that the rubber cannot be stripped from the metal without tearing into the body of the elastomer.

Examples VIII through XI illustrate the use of two-coat adhesive systems.

*Examples VII through XI.—Elastomer compounds*

Natural rubber: Parts
   Smoked sheet _____ 100
   High abrasion furnace black _____ 50
   Zinc oxide _____ 15
   Stearic acid _____ 1
   Sulfur _____ 2
   Benzothiazyl disulfide _____ 1.5
   Zinc dimethyl dithiocarbamate _____ 0.2
Neoprene:
   Neoprene type WRT _____ 100
   Fine furnace black _____ 50
   Zinc oxide _____ 5
   Magnesium oxide _____ 4
   Stearic acid _____ 0.5
   2-mercaptoimidazoline _____ 0.5
GR–S:
   GR–S (standard) _____ 100
   Channel black _____ 60
   Zinc oxide _____ 5
   Sulfur _____ .35
   Tetraethylthiuramidisulfide _____ 3.5

In each case the secondary cement consists of 100 parts after-brominated poly 2,3-dichlorobutadiene-1,3 (approximately 27 mol percent Br), 20 parts 2,5-dinitrosoparacymene and 300 parts toluene. The primer coats are applied to degreased, grit-blasted steel and allowed to dry for approximately 30 minutes. The secondary cements are then applied over the primer coat and allowed to dry. The indicated elastomer compound is then applied to the adhesive coated metal and the assembly vulcanized under pressure for 30 minutes at 307° F. The bonds thus formed are of such strength that in all cases attempts to strip the rubber from the metal result in failure of the body elastomer.

| Composition of Metal Priming Coat | Elastomer Employed |
|---|---|
| Example VII:<br>100 parts ketone soluble, base catalyzed, solid, thermosetting resinous phenol-aldehyde condensate. 200 parts methyl ethyl ketone. | Neoprene. |
| Example VIII:<br>100 parts polyvinyl butyral, XYHL grade.<br>666 parts methanol. | Natural rubber. |
| Example IX:<br>100 parts chlorinated neoprene (chlorine 67%, viscosity 20% solution in toluene, 125 CPS at 25° C.).<br>300 parts toluene. | Do. |
| Example X:<br>100 parts P,P',P''-triisocyanate triphenyl methane.<br>300 parts methylene chloride. | GR–S. |
| Example XI:<br>100 parts chlorinated polyvinyl chloride (Vinyon N).<br>400 parts monochlorobenzene. | Neoprene. |

*Example XII*

An adhesive consisting of 75 parts chlorinated rubber (125 CPS grade), 25 parts paradinitrosobenzene and 300 parts toluene is used to bond steel and freshly sheeted unvulcanized natural rubber compound consisting of 100 parts smoked sheet, 30 parts channel black, 15 parts zinc oxide, 2.75 parts stearic acid, 3 parts sulfur, 0.6 part tetramethyl thiuram monosulfide, 2 parts pine tar and 0.75 part phenyl-beta-naphthylamine under the conditions set forth in Example I. The same is done for an adhesive consisting of 75 parts chlorinated rubber (125 CPS grade), 25 parts sulfur and 300 parts toluene. Adhesion is measured in pounds per inch. The sulfur-containing mix produces a bond pulling at 17 pounds per inch. The nitrosobenzene-containing mix produces a bond pulling at 86 pounds per inch.

*Example XIII*

An adhesive consisting of 50 parts p-dinitrosobenzene, 50 parts alkylene oxide-bisphenol. A derivative esterified with fumaric acid, 1.5 parts benzoyl peroxide, 0.5 part cobalt naphthenate, 140 parts toluene and 10 parts methyl ethyl ketone is applied to a degreased, grit-blasted steel surface and allowed to dry for approximately one hour. A slab of freshly sheeted unvulcanized natural rubber compound consisting of 100 parts smoked sheets, 30 parts channel black, 15 parts zinc oxide, 2.75 parts stearic acid, 3 parts sulfur, 0.6 part tetramethyl thiuram monosulfide, 2 parts pine tar, and 0.75 part phenyl-beta-naphthylamine is applied to the adhesive-coated surface and the assembly vulcanized under pressure for 30 minutes at 312° F. The bond which results is such that the elastomer cannot be stripped from the metal without tearing into the body of the elastomer.

*Example XIV*

An adhesive consisting of 50 parts p-dinitrosobenzene, 35 parts epichlorohydrin-bisphenol A condensate (epoxide equavalent of approximately 900–1000), 15 parts phthalic anhydride and 150 parts methyl ethyl ketone is applied to a degreased anodized duraluminum surface and allowed to dry for approximately one hour. A slab of freshly sheeted unvulcanized natural rubber compound of the type employed in Example XIII is applied to the adhesive coated surface and the assembly vulcanized under pressure for 30 minutes at 312° F. The bond which results is such that the elastomer cannot be stripped from the metal without tearing into the body of the elastomer.

While the compositions disclosed and claimed herein are especially useful in the bonding of rubber to metal, individual species thereof have other uses due to their film-forming and adhesive properties.

Considerable modification is possible in selecting the di-C-nitroso aromatic compound and metal adherent, and reactive olefin, and amounts thereof without departing from the scope of the present invention.

What is claimed is:

1. An adhesive composition for bonding rubber to metal comprising chlorinated rubber and at least 1%, by weight, of a poly-C-nitroso aromatic compound.

2. An adhesive composition for bonding rubber to metal comprising chlorinated rubber and at least 1%, by weight, of a di-C-nitroso aromatic compound.

3. An adhesive composition for bonding rubber to metal comprising chlorinated rubber and at least 1%, by weight, of a di-C-nitroso aromatic compound selected from the group consisting of dinitrosobenzenes and dinitrosonaphthalenes.

4. An adhesive composition for bonding rubber to metal comprising chlorinated rubber and at least 1%, by weight, of p-dinitrosobenzene.

5. An adhesive composition for bonding rubber to metal comprising a solution of chlorinated rubber and at least 1%, by weight, of a di-C-nitroso aromatic compound based on the weight of the solids.

6. An adhesive composition for bonding rubber to metal comprising a solution of chlorinated rubber and at least 1%, by weight, of a di-C-nitroso aromatic compound based on the weight of the solids, said solution having a solids content of from about 5 to about 30 percent, by weight.

7. An adhesive composition for bonding rubber to metal comprising a solution of chlorinated rubber and at least 1%, by weight, of a di-C-nitroso aromatic compound based on the weight of the solids, said solution having a solids content of from about 10 to about 25 percent, by weight.

8. An adhesive composition for bonding rubber to metal, comprising a solution in an aromatic solvent, of chlorinated rubber and at least 1%, by weight, of a di-C-nitroso aromatic compound based on the weight of the solids.

9. An adhesive composition according to claim 8 in which said di-C-nitroso aromatic compound is p-dinitrosobenzene.

10. The method of bonding rubber to metal which comprises interposing between said rubber and metal an intermediate layer comprising chlorinated rubber and at least 1%, by weight, of a poly-C-nitroso aromatic compound, and heating the resulting composite structure under pressure to vulcanize said rubber and bond said rubber to the metal.

11. The method according to claim 10 in which said rubber comprises unvulcanized natural rubber.

12. The method according to claim 10 in which said rubber comprises polybutadiene.

13. The method of bonding rubber to metal which comprises interposing between said rubber and metal an intermediate layer comprising chlorinated rubber and at least 1%, by weight, of a di-C-nitroso aromatic compound, and heating the resulting composite structure under pressure to vulcanize said rubber and bond said rubber to the metal.

14. The method according to claim 13 in which said rubber comprises unvulcanized natural rubber.

15. The method according to claim 13 in which said rubber comprises polybutadiene.

References Cited by the Examiner

UNITED STATES PATENTS

| | | | |
|---|---|---|---|
| 2,183,342 | 12/1939 | Williams | 260—760 |
| 2,548,505 | 4/1951 | Turner | 260—85.1 X |
| 2,581,920 | 1/1952 | Kuhn | 156—333 X |
| 2,631,953 | 3/1953 | Hubbard et al. | 161—221 |
| 2,690,780 | 10/1954 | Cousins. | |
| 2,900,292 | 8/1959 | Coleman et al. | 161—218 X |
| 2,905,582 | 9/1959 | Coleman et al. | 156—331 X |
| 3,053,712 | 9/1962 | Grabowski | 156—333 |

OTHER REFERENCES

Rehner, J., Jr., and Flory, P. J., Vulcanization Reactions of Butyl Rubber, in Rubber Chemistry and Technology, vol. 19, October 1946, pages 904-907.

EARL M. BERGERT, *Primary Examiner.*

CLIFTON B. COSBY, *Examiner.*